United States Patent Office 3,236,815
Patented Feb. 22, 1966

3,236,815
HYDROXYL TERMINATED POLYETHER POLY-
URETHANE MILLABLE GUM
Kenneth A. Pigott, Bridgeville, and William Archer, Jr.,
Eighty-Four, Pa., assignors to Mobay Chemical Com-
pany, Pittsburgh, Pa., a corporation of Delaware
No Drawing. Filed Oct. 16, 1962, Ser. No. 231,026
7 Claims. (Cl. 260—77.5)

This invention relates to polyurethane plastics and in-
termediate products obtained from active hydrogen con-
taining compounds and organic polyisocyanates and more
particularly, to novel rubber-like polyurethane gums and
elastomeric products obtained therefrom.

It has been proposed heretofore to prepare elastomeric
gums by reacting a polyhydric polyalkylene ether with an
excess of an organic polyisocyanate in a first step and then
reacting the resulting prepolymer with water on a rubber
mill. In our co-pending application Serial No. 726,645,
now U.S. Patent 3,115,481, it was proposed to prepare
solidified, rubber-like, substantially non-porous polyure-
thane plastics having improved abrasion resistance and
hydrolysis aging characteristics by reacting a polyether
having terminal hydroxyl groups and water simultane-
ously with an organic diisocyanate under conditions such
that a millable gum is prepared. It has now been found
that the product prepared either on the rubber mill or in
the single stage process of the above-mentioned patent is
sometimes difficult to mill because the product either
sticks to the rolls of the mill or it will not form a smooth
band. This difficulty has somewhat retarded the use of
these gums commercially.

It is therefore an object of this invention to provide a
millable gum which is substantially devoid of these dis-
advantages. Another object of this invention is to pro-
vide a substantially non-porous, solid, rubber-like poly-
urethane which has improved tensile strength, elongation
and tear strength in conjunction with good processing
characteristics. A further object of this invention is to
provide a millable gum based on polyhydric polyalkylene
ethers, organic polyisocyanates and water which has a
high ratio of urea groups to urethane groups and is yet
easily processed on a rubber mill. Still another object of
this invention is to provide a method of making highly
cross-linked polyurethane elastomers through the millable
gum technique from conventional materials without
processing difficulties.

The foregoing objects and others which will become
apparent from the following description are accomplished
in accordance with the invention, generally speaking, by
providing an hydroxyl containing millable gum which can
be cured by the addition of an organic polyisocyanate to
form a solidified substantially non-porous polyurethane
elastomer by first preparing an —NCO containing pre-
polymer by reacting from about 0.5 to about 0.6 mol of
a polyalkylene either glycol saving a molecular weight of
from about 400 to about 3000, from about 0.2 to about
0.3 mol of a polyhydric polyalkylene ether having three
hydroxyl groups and a molecular weight of from about
400 to about 4000, from about 0.3 to about 0.7 mol of
water and about 3 to about 3.5 mols of an aromatic di-
isocyanate and then reacting the thus formed —NCO
containing prepolymer with a quantity of a dihydric
alcohol having a molecular weight less than about 180
such that the overall —NCO to —OH ratio of the gum is
from about 0.9 to about 0.99. In practicing the process
of this invention it is necessary that the polyalkylene ether
glycol and the trihydric polyalkylene ether have an aver-
age molecular weight of from about 1000 to about 3000.
Thus, the invention contemplates the preparation of an
hydroxyl terminated millable gum by a two step procedure
wherein a dihydric polyalkylene ether, a trihydric poly-
alkylene ether, water and an aromatic diisocyanate are
reacted in the first step to prepare an —NCO terminated
prepolymer and this prepolymer is reacted in a second step
with a quantity of a dihydric alcohol having a molecular
weight less than 180 such that the —NCO to —OH ratio
is from about 0.9 to about 0.99. By using this method
and the reactants in the ratios set forth, not only is a gum
produced which is easily milled on conventional equip-
ment used in the rubber industry but the final products
obtained by curing the gum with an additional amount
of organic polyisocyanate exhibits outstanding physical
properties.

In the preparation of the millable gum in accordance
with this invention the dihydric polyalkylene ether, the
trihydric polyalkylene ether and water may first be in-
timately combined and then the aromatic diisocyanate
added to this mixture. Furthermore, each of the four
reactants utilized in the first step in the preparation of
the millable gum may be simultaneously mixed together.
Any suitable apparatus such as that disclosed in U.S. Re-
issue Patent 24,514 may be used. In the first step of
the preparation of the millable gum the isocyanate is
added in excess over that required to react with all the
active hydrogen atoms present.

In the second step of the reaction a dihydric alcohol
is added to the —NCO terminated prepolymer to obtain
a millable gum. The —NCO to —OH ratio of the gum
must be maintained at a value from about 0.9 to about
0.99 to obtain a gum having proper milling characteristics.
It is preferred that the —NCO to —OH ratio of the gum
is from about 0.94 to about 0.98. Gums having an
—NCO to —OH ratio less than 0.9 will stick to the rolls
of the rubber mill and thus are unsatisfactory. Those
having an —NCO to —OH ratio greater than 0.99 will
not mill well because they are hard and tend to have a
memory. That is, as the gum is processed through the
nip of the rolls of a roll mill, it tends to draw back yield-
ing an irregular surface instead of spreading out into a
smooth band. This characteristic makes it difficult to
combine the gum in the curing step with an additional
amount of an isocyanate.

In the process of this invention any suitable dihydric
polyalkylene ether having a molecular weight of about
400 to about 3000 may be used, such as, for example, the
condensation products of an alkylene oxide, such as, for
example, ethylene oxide, propylene oxide, butylene oxide,
amylene oxide, epichlorohydrin and the like; the conden-
sation products of any of the above mentioned alkylene
oxides with a compound having two active hydrogen
atoms, such as, for example, water, aliphatic diols, such
as, for example, ethylene glycol, propyleneglycol, butyl-
ene glycol, thiodiglycol and the like. It is preferred that
the dihydric polyalkylene ethers have the formula $$HO(RO)_nH$$

wherein R is a straight or branched chain aliphatic hydro-
carbon having from 2 to 5 carbon atoms and $n$ is an
integer corresponding to the desired molecular weight
within the range of from about 400 to about 3000.

Any suitable trihydric polyalkylene ether having a
molecular weight of from about 400 to about 4000 may
be used, such as, for example, the condensation products
of any of the above alkylene oxides with compounds con-
taining 3 active hydrogen atoms such as, for example,
triols including trimethylol propane, glycerine, hexane-
triol, pyrogallol; aminoalcohols such as, for example,
aminoethyl alcohol, aminopropyl alcohol, aminobutyl al-
cohol and the like; ammonia, aminophenol and the like.
In a preferred embodiment the dihydric polyalkylene
ether is used in an amount of about 0.5 mol and the tri-
hydric poylalkylene ether is used in an amount of about
0.22 mol.

Any suitable aromatic polyisocyanate may be used in the preparation of the millable gum such as, for example, 2,4-tolylene diisocyanate, 2,6-tolylene diisocyanate, isomeric mixtures of 2,4- and 2,6-tolylene diisocyanate, 4,4'-diphenylmethane diisocyanate, 1,5-napthalene diisocyanate, p-phenylene diisocyanate, m-phenylene diisocyanate, 2-nitro-4,4'-phenylenediisocyanate, 2-chloro-4,4-phenylene diisocyanate and the like. It is preferred however, to use 2,4-tolylene diisocyanate and isomeric mixture of 2,4- and 2,6-tolylene diisocyanate. A particular suitable isomeric mixture is 80% 2,4- and 20% 2,6-tolylene diisocyanate. As stated previously the isocyanate is added in an amount in excess of the active hydrogen atoms present in the preparation of the prepolymer and in an amount such that the millable gum has an —NCO to —OH ratio of 0.9 to 0.99 upon adding the dihydric alcohol to the prepolymer.

After the preparation of the —NCO terminated prepolymer in the first step of the process in accordance with this invention, any suitable dihydric alcohol having molecular weight less than about 180 and preferably within the range from about 60 to about 180 is added such as, for example, ethylene glycol, 1,2-propylene glycol, 1,3-propylene glycol, 1,4-butanediol, 1,3-butanediol, diethylene glycol, dipropylene glycol, 1,6-hexanediol, thiodiglycol and the like.

After the preparation of the millable gum is complete it may be processed on a rubber mill at any time with an additional quantity of an organic polyisocyanate to form a finally cured product. Any suitable polyisocyanate such as, for example, those mentioned above with respect to the preparation of the millable gum may be used. Further, the dimer of any of these isocyanates such as the dimer of 2,4-tolylene diisocyanate, triisocyanates, such as, 4,4',4"-tetraphenylmethane diisocyanate, 2,4,6-tolylene triisocyanate, 1,3,5-benzene triisocyanate, 4,4',4",4'''-tetraphenylmethane tetraisocyanate and the like may be used. It is preferred in this step of the procedure to use the dimer of 2,4-tolylene diisocyanate. The isocyanate added in this step of the procedure is in the amount of from about 6 parts to about 10 parts per 100 parts of the millable gum.

The millable gum when processed with the additional amount of polyisocyanate as stated above yields a stock suitable for further fabrication and shaping under heat and pressure to produce many useful articles including automobile tires, shoe heels, bearings, ball joints and the like.

The invention is further illustrated by the following examples in which the parts are by weight unless otherwise indicated.

*Example 1*

About 100 parts of a polypropylene ether glycol having a molecular weight of about 2000 and an hydroxyl number of about 56 are combined with about 66.7 parts of a trihydric polypropylene ether obtained from propylene oxide condensed on glycerine to a molecular weight of about 3000 and having an hydroxyl number of about 56, about .99 part of water and about 56.28 parts of an isomeric mixture of 80% 2,4-tolylene diisocyanate and 20% 2,6-tolylene diisocyanate. About 100 parts of the resulting prepolymer is then combined with about 8.24 parts of 1,4-butanediol poured into a mold and cured for 16 hours at about 110° C. A crepe is obtained which mills satisfactorily without sticking on the mill. To about 100 parts of this gum is added about 25 parts of carbon black, about 0.5 part of stearic acid and about 8 parts of the dimer of tolylene diisocyanate having the formula

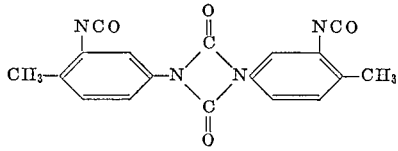

After milling, the structure is placed into molds and cured at a temperature of about 265° F. and a pressure of about 1500 p.s.i. to yield polyurethane elastomers having the following physical properties:

| | |
|---|---|
| Tensile strength _____ p.s.i__ | 3160 |
| Elongation _____ percent__ | 330 |
| Tear strength _____ lbs./inch__ | 45 |
| Shore hardness A _____ | 79 |

*Example 2*

About 100 parts of polypropylene ether glycol having a molecular weight of about 2000 and an hydroxyl number of about 56 are combined with 66.7 parts of a trihydric polypropylene ether obtained from propylene oxide condensed on glycerine to a molecular weight of about 3000 having an hydroxyl number of about 56, about 0.83 part of water and about 34.74 parts of a mixture of 80% 2,4-tolylene diisocyanate and 20% 2,6-tolylene diisocyanate. About 100 parts of the resulting prepolymer is then combined with about 8.04 parts of 1,4-butanediol, poured into a pan and cured 16 hours at 110° C. A crepe is obtained which mills satisfactorily without sticking to the mill. To about 100 parts of this gum is added 25 parts of carbon black, about .5 part stearic acid and about 8 parts of the dimer of tolylene diisocyanate having the formula shown in Example 1. After milling the structure is placed into molds and cured at a temperature of about 265° F. and a pressure of about 1500 p.s.i. to yield a polyurethane elastomer having the following physical properties:

| | |
|---|---|
| Tensile strength _____ p.s.i__ | 2790 |
| Elongation _____ percent__ | 290 |
| Tear strength _____ lb./inch__ | 38 |
| Shore hardness A _____ | 47 |

*Example 3*

About 100 parts of polypropylene ether glycol having a molecular weight of about 2000 and an hydroxyl number of about 56 are combined with about 66.7 parts of a trihydric polypropylene ether obtained from propylene oxide condensed on glycerine to a molecular weight of about 3000 and having an hydroxyl number of about 56, about 0.83 part of water and about 54.74 parts of a mixture of 80% 2,4-tolylene diisocyanate and 20% 2,6-tolylene diisocyanate. About 100 parts of the resulting prepolymer is then combined with about 8.1 parts of 1,4-butane-diol, poured into a mold and cured 16 hours at 110° C. A crepe is obtained which mills satisfactorily without sticking on the mill. To about 100 parts of this gum is added 25 parts of carbon black, about .5 part stearic acid and about 8 parts of the dimer of tolylene diisocyanate having the formula described in Example 1. After milling, the structure is placed into molds and cured at a temperature of about 265° F. and a pressure of about 1500 p.s.i. to yield polyurethane elastomers having the following physical properties:

| | |
|---|---|
| Tensile strength _____ p.s.i__ | 2800 |
| Elongation _____ percent__ | 300 |
| Tear strength _____ lb./inch__ | 37 |
| Shore hardness A _____ | 79 |

It is of course to be understood that any of the dihydric polyalkylene ethers, trihydric polyalkylene ethers, dihydric alcohols or aromatic diisocyanates mentioned above may be utilized in the preparation of the gum in the working examples for that specially used therein. Further, the millable gums may have included therein suitable fillers, pigments, and the like and may be cured utilizing any of the isocyanates set forth for this purpose.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method of making a millable polyurethane gum which comprises reacting from about 0.5 mol to about 0.6 mol of a polyalkylene ether glycol having a molecular weight of from about 400 to about 3000, from about 0.2 mol to about 0.3 mol of a trihydric polyalkylene ether having a molecular weight of from about 400 to about 4000, the average molecular weight of the two polyalkylene ethers being from about 1000 to about 3000 and from about 0.3 mol to about 0.7 mol of water with about 3 mols to about 3.5 mols of an aromatic diisocyanate to prepare a prepolymer having terminal NCO groups in a first step and reacting this prepolymer with an amount of a dihydric alcohol having a molecular weight less than 180 such that the —NCO to —OH ratio of the resulting gum is from about 0.9/1 to about 0.99/1.

2. A method of making a millable polyurethane gum which comprises reacting from about 0.5 mol to about 0.6 mol of a polyalkylene ether glycol having a molecular weight of from about 400 to about 3000, from about 0.2 mol to about 0.3 mol of a trihydric polyalkylene ether having a molecular weight of from about 400 to about 4000, the average molecular weight of the two polyalkylene ethers being from about 1000 to about 3000 and from about 0.3 mol to about 0.7 mol of water with about 3 mols to about 3.5 mols of an aromatic diisocyanate to prepare a prepolymer having terminal NCO groups in a first step and reacting this prepolymer with an amount of a dihydric alcohol having a molecular weight of from about 60 to about 180 such that the —NCO to —OH ratio of the resulting gum is from about 0.9/1 to about 0.99/1.

3. A method of making a millable polyurethane gum which comprises reacting from about 0.5 mol to about 0.6 mol of a polyalkylene ether glycol having a molecular weight of from about 400 to about 3000, from about 0.2 mol to about 0.3 mol of a trihydric polyalkylene ether having a molecular weight of from about 400 to about 4000, the average molecular weight of the two polyalkylene ethers being from about 1000 to about 3000 and from about 0.3 mol to about 0.7 mol of water with about 3 mols to about 3.5 mols of an aromatic diisocyanate to prepare a prepolymer having terminal NCO groups in a first step and reacting this prepolymer with an amount of a dihydric alcohol having a molecular weight less than 180 such that the —NCO to —OH ratio of the resulting gum is from about 0.94/1 to about 0.98/1.

4. A method of making a millable polyurethane gum which comprises reacting from about 0.5 mol to about 0.6 mol of a polyalkylene ether glycol having a molecular weight of about 2,000 from about 0.2 mol to about 0.3 mol of a trihydric polyalkylene ether having a molecular weight of about 3,000 and from about 0.3 mol to about 0.7 mol of water with about 3 mols to about 3.5 mols of an aromatic diisocyanate to prepare a prepolymer having terminal NCO groups in a first step and reacting this prepolymer with an amount of a dihydric alcohol having a molecular weight of from about 60 to about 180 such that the —NCO to —OH ratio of the resulting gum is from about 0.9/1 to about 0.99/1.

5. The process of claim 1 wherein the aromatic diisocyanate is tolylene diisocyanate.

6. The process of claim 1 wherein the aromatic diisocyanate is 4,4'-diphenylmethane diisocyanate.

7. The millable polyurethane gum as prepared by the process of claim 1, which is capable of being cured to a non-porous elastomer by the addition of an organic polyisocyanate.

References Cited by the Examiner

UNITED STATES PATENTS

| | | | |
|---|---|---|---|
| 2,692,874 | 10/1954 | Langerak | 260—77.5 |
| 2,871,226 | 4/1959 | McShane | 260—77.5 |
| 2,981,719 | 4/1961 | Mühlhausen et al. | 260—77.5 |
| 3,036,022 | 5/1962 | Stewart | 260—77.5 |
| 3,094,495 | 6/1963 | Gemeinhardt | 260—77.5 |

OTHER REFERENCES

Du Pont Bulletin HR–27, July 1958, page 9, Table III.

LEON J. BERCOVITZ, *Primary Examiner.*

DONALD E. CZAJA, *Examiner.*